(12) United States Patent
Buchmueller et al.

(10) Patent No.: US 9,586,683 B1
(45) Date of Patent: Mar. 7, 2017

(54) TRANSITIONING AN UNMANNED AERIAL VEHICLE TO HORIZONTAL FLIGHT

(71) Applicant: Amazon Technologies, Inc., Seattle, WA (US)

(72) Inventors: Daniel Buchmueller, Seattle, WA (US); Gur Kimchi, Bellevue, WA (US); Louis LeRoi LeGrand, III, Seattle, WA (US); Samuel Park, Seattle, WA (US); Christopher Hammond Sczudlo, Seattle, WA (US); Ricky Dean Welsh, Bellevue, WA (US); Neil Whitney Woodward, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/580,066

(22) Filed: Dec. 22, 2014

(51) Int. Cl.
*G05D 1/10* (2006.01)
*B64C 39/02* (2006.01)

(52) U.S. Cl.
CPC .......... *B64C 39/024* (2013.01); *G05D 1/101* (2013.01); *B64C 2201/108* (2013.01); *B64C 2201/146* (2013.01)

(58) Field of Classification Search
CPC .............................. B64C 39/024; G05D 1/101
See application file for complete search history.

(56) References Cited

U.S. PATENT DOCUMENTS

2015/0197335 A1* 7/2015 Dekel ................. B64C 29/0033
701/5

* cited by examiner

*Primary Examiner* — Basil T Jos
(74) *Attorney, Agent, or Firm* — Arthorus, PLLC

(57) ABSTRACT

This disclosure describes a configuration of an unmanned aerial vehicle (UAV) that will facilitate extended flight duration. The UAV may have any number of lifting motors. For example, the UAV may include four lifting motors (also known as a quad-copter), eight lifting motors (octo-copter), etc. Likewise, to improve the efficiency of horizontal flight, the UAV also includes a thrusting motor and propeller assembly that is oriented at approximately ninety degrees to one or more of the lifting motors. When the UAV is moving horizontally, it may be determined if the horizontal airspeed of the UAV exceeds an airspeed threshold. If the horizontal airspeed exceeds the airspeed threshold, the thrusting motor may be engaged and the thrusting propeller will aid in the horizontal propulsion of the UAV.

20 Claims, 7 Drawing Sheets

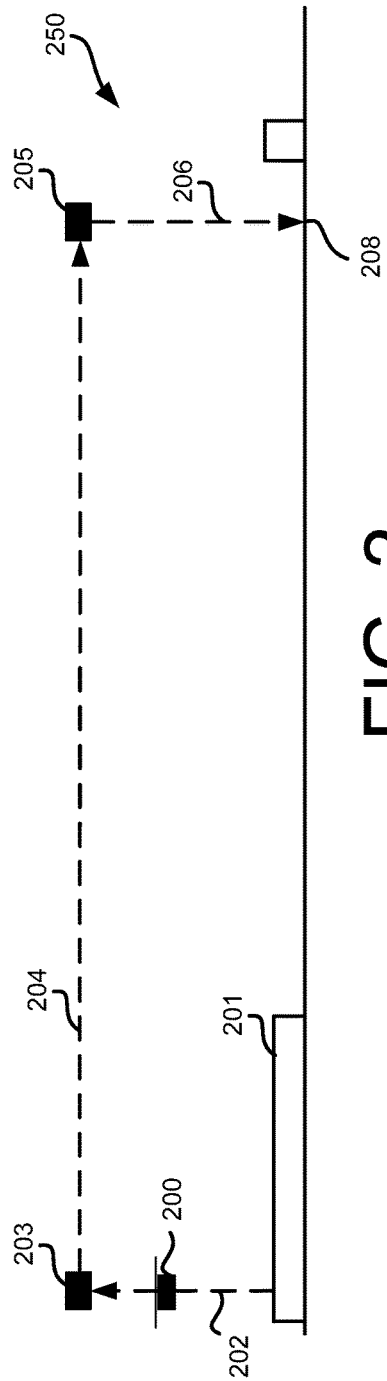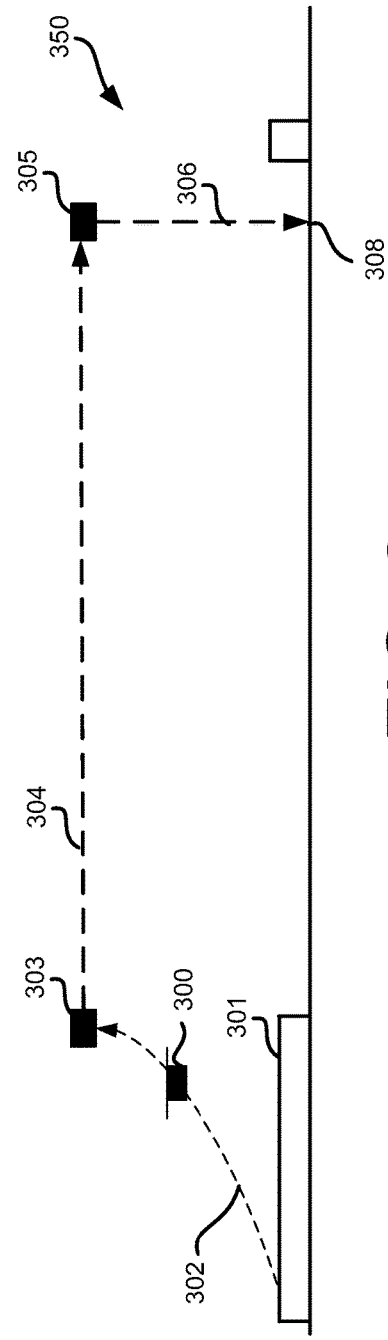

TRANSITIONING AN UNMANNED AERIAL VEHICLE TO HORIZONTAL FLIGHT

BACKGROUND

Multi-propeller aerial vehicles (e.g., quad-copters, octo-copters) are becoming more common. All such vehicles require a body configuration that will support the separation of the multiple propellers, the control components, the power supply (e.g., battery), etc. However, there is a balance between weight and duration of flight. As the weight increases, for example to support more components, the flight duration will decrease.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 depicts a block diagram of a flight plan, according to an implementation.

FIG. 3 depicts a block diagram of another flight plan, according to an implementation.

Figure 1A:
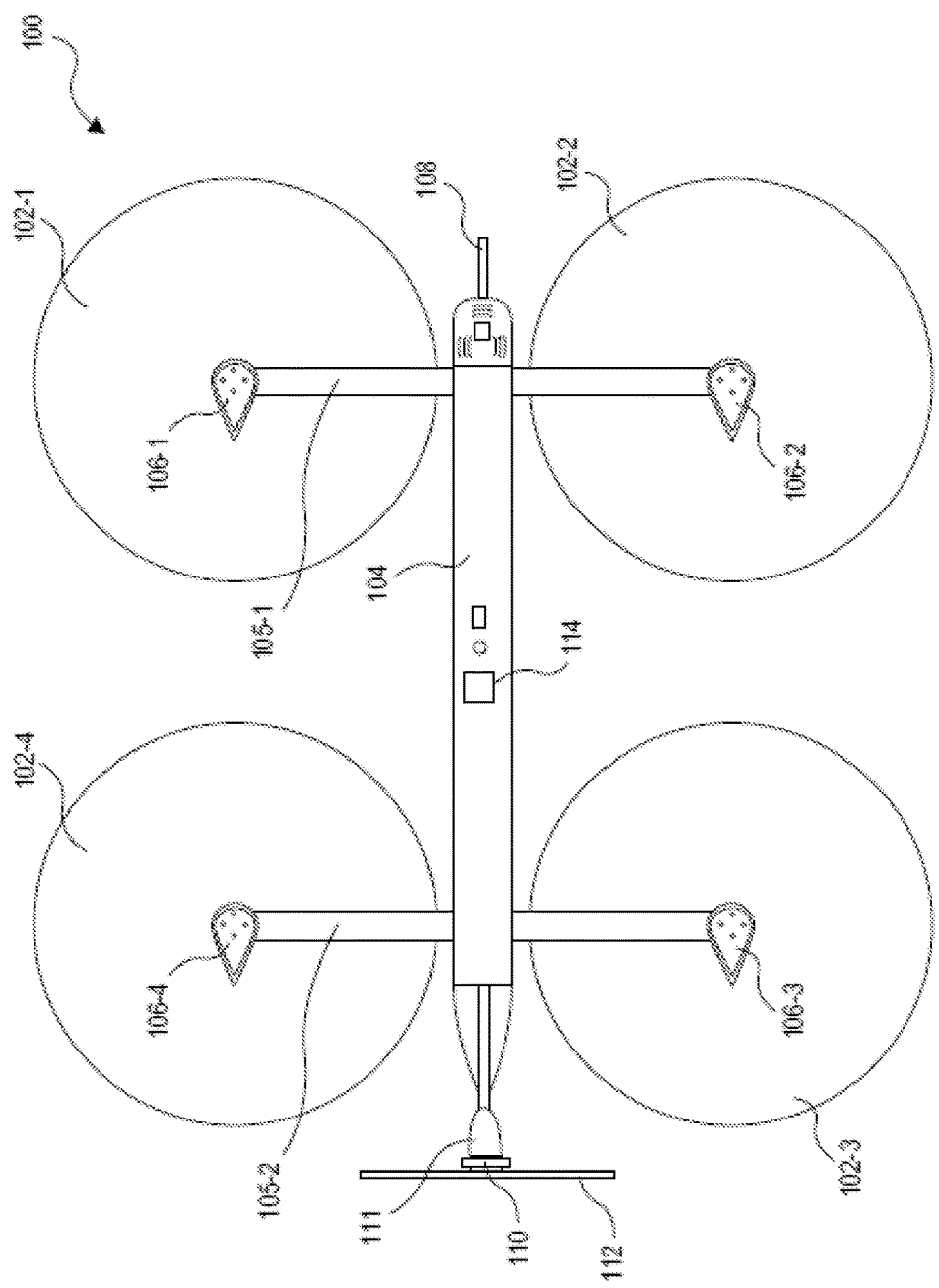
FIG. 1A depicts a block diagram of a top-down view of an unmanned aerial vehicle, according to an implementation.

While implementations are described herein by way of example, those skilled in the art will recognize that the implementations are not limited to the examples or dra wings described. It should be understood that the dra wings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a configuration of an unmanned aerial vehicle ("UAV") that will facilitate extended flight duration and a process for transitioning the UAV to a flight path that includes a horizontal component. The UAV may have any number of lifting motors. For example, the UAV may include four lifting motors (also known as a quad-copter), eight lifting motors (also known as an octo-copter), etc. Likewise, to improve the efficiency of horizontal flight, the UAV also includes a thrusting motor and propeller assembly that is oriented at approximately ninety degrees to one or more of the lifting motors, lifting propellers, the frame of the UAV, and/or the motor arm of the UAV. When the UAV is moving in a direction that includes a horizontal component, the thrusting motor may be engaged and the thrusting propeller will aid in the horizontal propulsion of the UAV. In some implementations, the rotational speed of the lifting motors may be reduced when the thrusting motor is engaged, thereby improving efficiency and reducing power consumption of the UAV. Likewise, in some implementations, the UAV may include a wing to aid in the vertical lift of the UAV while the UAV is moving in a direction that includes a horizontal component.

In some implementations, a determination may be made as to whether the horizontal airspeed of the UAV exceeds an airspeed threshold. Horizontal airspeed is the speed of the UAV with respect to air in a substantially horizontal direction.

If the horizontal airspeed of the UAV exceeds an airspeed threshold, the thrusting motor may be engaged to aid in the propulsion of the UAV in a direction that includes a horizontal component. If the horizontal airspeed of the UAV does not exceed the airspeed threshold, the thrusting motor is not be engaged and/or may be disengaged.

In some implementations, a fuselage may be aerodynamically designed to mount on an underneath or bottom side of the frame and be configured to contain components and power supplies of the UAV. For example, the fuselage may be formed from carbon fiber and mount to ridges or grooves in the frame FIG. 1A illustrates a block diagram of a top-down view of a UAV 100, according to an implementation. As illustrated, the UAV 100 includes a frame 104. The frame 104 or body of the UAV 100 may be formed of any suitable material, such as graphite, carbon fiber, aluminum, etc., or any combination thereof. In this example, the frame 104 of the UAV 100 is formed of machined aluminum in a rectangular shape. In some implementations, the underneath or bottom side of the frame 104 may be machined into a grid or hash pattern to reduce the weight of the frame, provide support, and provide locations for mounting components of the UAV 100.

Mounted to the frame are two motor arms 105-1, 105-2. In this example, the motor arms 105-1, 105-2 are approximately the same length, are arranged substantially parallel to one another and perpendicular to the frame 104. In other implementations, the motor arms 105 may be of different lengths (e.g., the front motor arm 105-1 may be shorter than the rear motor arm 105-2) and/or arranged at different locations on the UAV 100.

Mounted to each end of the motor arms 105 are lifting motor housings 106-1, 106-2, 106-3, 106-4. The lifting motor housings 106 may be formed of any material, such as carbon fiber, aluminum, graphite, etc. In this example, the lifting motor housings 106 are aerodynamically shaped to reduce friction of air flow during horizontal flight of the UAV.

Mounted inside each lifting motor housing 106 is a lifting motor (not shown in FIG. 1A). In one implementation, the lifting motors are mounted so that propeller shaft of the lifting motor that mounts to the propeller 102 is facing downward with respect to the UAV 100. In other implementations, the lifting motors may be mounted with the propeller shaft facing upwards with respect to the UAV 100. In still other implementations, one or more of the lifting motors may be mounted with the propeller shaft facing downward and one or more of the lifting motors may be mounted with the propeller shaft facing upward. In other implementations, the lifting motors may be mounted at other angles with respect to the frame of the UAV 100. Likewise, in some implementations, the lifting motors and/or the motor arms may be rotatable with respect to the frame 104 of the UAV 100. The lifting motors may be any form of motor capable of generating enough rotational speed with the propellers to lift the UAV 100 and any engaged payload, thereby enabling aerial transport of the payload. For example, the lifting motors may each be a FX-4006-13 740 kv multi-rotor motor, or a Tiger U-11 motor.

Mounted to each lifting motor is a lifting propeller 102-1, 102-2, 102-3, and 102-4. The lifting propellers 102 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery location. For example, the lifting propellers 102 may each be carbon fiber propellers having a dimension or diameter of twenty-nine inches. While the illustration of FIG. 1 shows the lifting propellers 102 all of a same size, in some implementations, one or more of the lifting propellers 102 may be different sizes and/or dimensions. Likewise, while this example includes four lifting propellers, in other implementations, more or fewer propellers may be utilized as lifting propellers. Likewise, in some implementations, the propellers may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide thrust for the UAV.

Mounted to a first end, or front end, of the frame 104 of the UAV 100 is one or more antennas 108. The antennas 108 may be used to transmit and/or receive wireless communications. For example, the antennas 108 may be utilized for Wi-Fi, satellite, near field communication ("NFC"), cellular communication, or any other form of wireless communication. Other components, such as cameras, time of flight sensors, distance determining elements, gimbals, etc. may likewise be mounted to the front of the frame 104 of the UAV 100.

Mounted to a second end, or rear end, of the frame 104 of the UAV 100 is a thrusting motor housing 111, a thrusting motor 110 and a thrusting propeller 112. While the term "thrusting motor" is used to reference a thrusting motor and thrusting propeller positioned on the rear of the UAV, those having ordinary skill will appreciate that the position of the thrusting motor 110 and thrusting propeller 112 may be reversed and reconfigured such that the thrusting motor 110 and thrusting propeller are mounted on the front of the UAV 100. In other implementations, there may be multiple thrusting motors and thrusting propellers mounted at different locations on the UAV 100.

The thrusting motor housing 111 may be aerodynamically shaped and configured to encase the thrusting motor 110. The thrusting motor 110 and the thrusting propeller 112 may be the same or different than the lifting motors and lifting propellers 102. For example, in some implementations, the thrusting motor 110 may be a Tiger U-8 motor and the thrusting propeller 112 may have a dimension of eighteen inches. In some implementations, the thrusting propeller may have a smaller dimension than the lifting propellers.

The thrusting motor 110 and thrusting propeller 112 may be oriented at approximately ninety degrees with respect to the frame 104 of the UAV 100 and utilized to increase the efficiency of flight that includes a horizontal component. For example, when the UAV 100 has a horizontal airspeed that exceeds an airspeed threshold, the thrusting motor 110 may be engaged to provide a horizontal force (thrust) via the thrusting propeller to propel the UAV 100 horizontally. As a result, the speed and power utilized by the lifting motors may be reduced. Alternatively, in selected implementations, the thrusting motor 110 may be oriented at an angle greater or less than ninety degrees with respect to frame 104 to provide a combination of thrust and lift.

One or more navigation components 114, such as a global positioning receiver/transmitter, may also be mounted to the top of the frame 104.

Figure 1B:
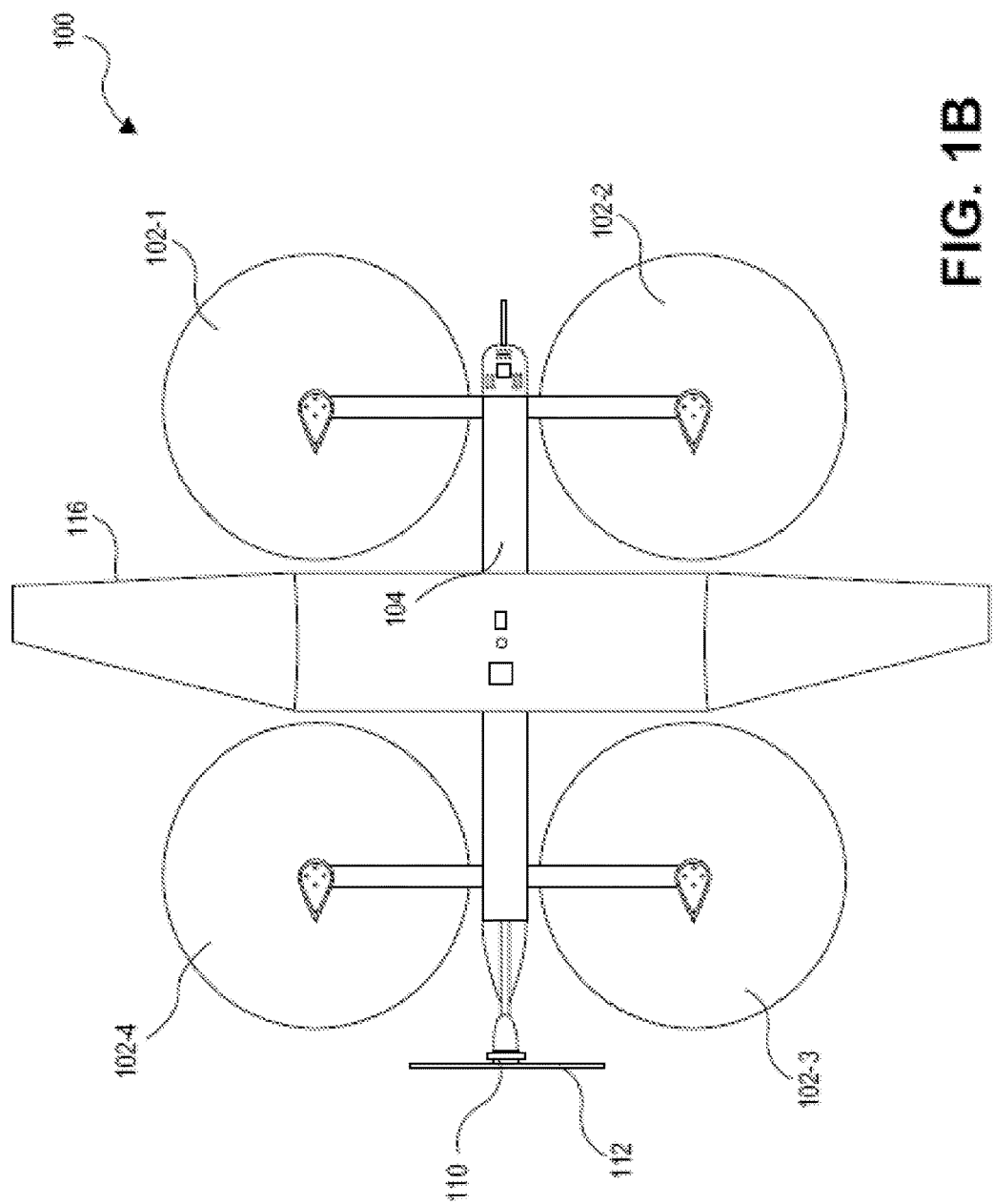
FIG. 1B depicts a block diagram of a top-down view of an unmanned aerial vehicle, according to an implementation.

FIG. 1B depicts another block diagram of a top-down view of a UAV 100, according to an implementation. In the example illustrated in FIG. 1B, the UAV 100 includes a wing 116 coupled to the frame of the UAV 100 and optionally a vertical stabilizer 117 and/or a horizontal stabilizers (not shown), mounted at the rear of the UAV 100. The wing, vertical stabilizer 117 and/or the horizontal stabilizers may be formed of any suitable material such as, but not limited to, carbon fiber, aluminum, fabric, plastic, fiberglass, etc. The wing 116 may be coupled to the top of the frame 104 and positioned between the lifting motors 102. In other implementations, the wing 116 may be positioned above the lifting motors and/or lifting propellers. The vertical stabilizer 117 and/or the horizontal stabilizers may be mounted toward the rear of the UAV 100 near the thrusting motor 110.

The wing is designed to have an airfoil shape to provide lift to the UAV 100 as the UAV 100 moves horizontally. In some implementations, utilizing the thrusting motor 110 and thrusting propeller 112 in conjunction with the wing 116, when the UAV 100 is moving in a direction that includes a horizontal component and/or the UAV has a sufficient horizontal airspeed, the rotational speed of the lifting motors and lifting propellers 102 may be reduced or eliminated as the wing 116 may provide lift and keep the UAV 100 airborne when thrust in a horizontal direction by the thrusting motor 110 and thrusting propeller 112 is applied.

In implementations where the wing includes flaps and/or ailerons, the pitch, yaw and/or roll of the UAV 100 may be controlled using the flaps and/or ailerons alone or in combination with the lifting motors and lifting propellers 102. If the wing does not include flaps and/or ailerons, the lifting motors and lifting propellers 102 may be utilized to control the pitch, yaw, and roll of the UAV 100 during flight. In some implementations, the wing 116 may be configured to rotate or pivot about the frame 104 of the UAV to reduce drag when the UAV 100 is moving a direction that includes a vertical component.

The vertical stabilizer 117 and/or the horizontal stabilizers are designed to stabilize the UAV 100 as it moves in a direction that includes a horizontal component. The vertical stabilizer 117 may include a rudder that can be moved left and right to control the yaw of the UAV 100. Likewise, the horizontal stabilizers may include elevators that are raised or lowered change the pitch of the UAV 100.

FIGS. 2 and 3 depict block diagrams of two example flight plans for navigating a UAV from a material handling facility to a delivery location, according to an implementation. A flight plan may include multiple flight paths. Each flight path may identify, for example, the direction(s), speed(s), ground track, altitude(s), and/or orientation(s) that are to be maintained by the UAV as it navigates the flight path.

Referring first to FIG. 2, the flight plan 250 includes a first path 202 from a position above a materials handling facility 201 to a transition altitude position 203, a second path 204 from the transition altitude position 203 above the materials handling facility 201 to a delivery altitude position 205 above a delivery location 208 (e.g., location near a user's home, place of business, etc.), and a third path 206 from the delivery altitude position 205 above the delivery location 208 to the delivery location 208.

In many implementations, a UAV 200 may transition from within a materials handling facility 201 to a position outside of the materials handling facility 201. For example, the materials handling facility 201 may include doors or other openings through which a UAV 200 may navigate to transition from inside a materials handling facility to outside the materials handling facility. The doors or other openings may be on the sides and/or top of the materials handling facility 201. For example, the flight plan 250 may initiate inside the materials handling facility 201 where the UAV 200 may engage or be coupled with a payload that is to be delivered to the delivery location 208 and transition through an opening in the top or roof of the materials handling facility 201 to outside of the materials handling facility 201.

Inside the materials handling facility 201, the environmental conditions may be at least partially controlled such that the wind speed is limited or maintained in a known direction and speed. However, outside the materials handling facility 201 the environmental conditions may continually vary. For example, the wind speed and/or direction may vary throughout the day.

To prepare a UAV 200 for transition from inside the materials handling facility 201 to outside the materials handling facility, the environmental conditions outside the materials handling facility 201 are determined. For example, one or more weather stations, weather monitoring components, etc. may be located outside the materials handling facility to monitor the environmental conditions. The monitored environmental conditions may include, but are not limited to, one or more of temperature, humidity, precipitation, barometric pressure, wind speed, wind direction, etc.

If the wind outside the materials handling facility 201 is traveling at a speed of 10 miles per hour in a southern direction, the first path 202 may be established to instruct a UAV 200 to orient a heading of the UAV 200 in a northern direction (into the wind) and provide the wind speed information to the UAV 200 so that it can anticipate and adjust the rotational speed of the UAV motors (lifting motors and/or thrusting motor) to account for the horizontal force that will be applied to the UAV 200 when the UAV 200 transitions from inside the materials handling facility to outside the materials handling facility. Likewise, rather than establishing a first path 202 that is completely vertical, as illustrated in FIG. 2, the first path 202 may include a portion in which the UAV 200 is to generate horizontal force to propel the UAV 200 in a northern direction as it transitions from inside the materials handling facility to outside the materials handling facility. The horizontal force may be substantially equal and opposite to the force that will be applied to the UAV 200 from the wind. As such, when the UAV begins to generate the horizontal force as it transitions from the materials handling facility and encounters the force applied from the wind, the UAV 200 will maintain a substantially vertical path, rather than being pushed in a southern direction from the force of the wind.

In some implementations, such as for UAVs that include a wing (e.g., UAV 100 illustrated in FIG. 1B) the pitch of the UAV 200 may be adjusted as it transitions from inside the materials handling facility to outside the materials handling facility 201 to account for the lifting force that will be generated by the wing of the UAV 200 as the UAV 200 transitions from inside the materials handling facility to outside the materials handling facility due to the horizontal force that will be applied to the UAV from the wind.

As the UAV navigates the flight plan, it may continually monitor the horizontal airspeed of the UAV and determine if the horizontal airspeed of the UAV 200 exceeds an airspeed threshold. Each flight path may be associated with an airspeed threshold. For example, during navigation of the first path 202 from the materials handling facility to a transition altitude position 203, the horizontal airspeed may be compared to a materials handling facility airspeed threshold. For example, the materials handling facility airspeed threshold may be 8 knots. If the UAV is rotating the lifting propellers at a speed sufficient to generate a horizontal airspeed of 8 knots and/or has a pitch or a roll sufficient that the lifting motors are generating a horizontal airspeed of 8 knots, it may be determined that the materials handling facility airspeed threshold has been exceeded. In response to determining that the horizontal airspeed of the UAV exceeds the materials handling facility airspeed threshold, the UAV 200 engages the thrusting motor that rotates the thrusting propeller at a rotational speed sufficient to generate a horizontal force (thrust).

As the thrusting propeller increases in rotational speed, thereby increasing the horizontal force generated by the thrusting propeller, the UAV may reduce the rotational speed of one or more of the lifting propellers and/or reduce the pitch and/or roll of the UAV 200 to reduce the horizontal force generated by the lifting propellers. Likewise, in implementations in which the UAV 200 includes a wing, the airfoil design of the wing generates a vertical force in relation to the horizontal airspeed of the UAV 200. In such an implementation, as the lifting force from the wing increases, the rotational speed of one or more of the lifting motors may likewise decrease.

In a similar manner, as the UAV transitions from the first path to the second path and/or as the UAV 200 navigates along the second path, the horizontal airspeed of the UAV 200 may be monitored and compared to a transition airspeed threshold. The second path 204 may be in a substantially horizontal direction from the altitude above the materials handling facility to an altitude above the delivery location 208.

The transition airspeed threshold may be any defined value. For example, the transition airspeed threshold may be 5 knots. If the UAV is rotating the lifting propellers at a speed sufficient to generate a horizontal airspeed of 5 knots and/or has a pitch or a roll sufficient that the lifting motors are generating a horizontal airspeed of 5 knots, it may be determined that the transition airspeed threshold has been exceeded. In response to determining that the horizontal airspeed of the UAV exceeds the transition airspeed threshold, the UAV 200 engages the thrusting motor that rotates the thrusting propeller at a rotational speed sufficient to generate a horizontal force (thrust).

As the thrusting propeller increases in rotational speed, thereby increasing the horizontal force generated by the thrusting propeller, the UAV may reduce the rotational speed of one or more of the lifting propellers and/or reduce the pitch and/or roll of the UAV 200 to reduce the horizontal force generated by the lifting propellers. Likewise, in implementations in which the UAV 200 includes a wing, the airfoil design of the wing generates a vertical force in relation to the horizontal airspeed of the UAV 200 and the pitch of the pitch of the UAV 200. In such an implementation, as the lifting force from the wing increases, the rotational speed of one or more of the lifting motors may likewise decrease.

In some implementations, because the second path 204 includes a horizontal component, the transition airspeed threshold may be effectively set to zero such that the UAV engages the thrusting motor to use the horizontal force generated by the thrusting motor to cause the UAV to navigate along the second path 204, regardless of the horizontal airspeed of the UAV. The horizontal force of the UAV 200 may be generated by the thrusting motor and thrusting propeller alone or in combination with the lifting motors and lifting propellers. For example, the lifting propellers may be maintained at a rotational speed sufficient to keep the UAV at or near the altitude of the second path 204 and the thrusting motor may be engaged and rotated at a speed sufficient to maintain the UAV at ground speed identified in the second path.

Finally when the UAV reaches the delivery altitude position 205 above the delivery location 208 and begins the third path 206 of the flight plan 250, the UAV monitors the horizontal airspeed of the UAV and determines if the horizontal airspeed exceeds a delivery location airspeed threshold. For example, the delivery location airspeed threshold may be 10 knots. If the UAV is rotating the lifting propellers at a speed sufficient to generate a horizontal airspeed of 10 knots and/or has a pitch or a roll sufficient that the lifting motors are generating a horizontal airspeed of 10 knots, it may be determined that the transition airspeed threshold has been exceeded. In response to determining that the horizontal airspeed of the UAV exceeds the transition airspeed threshold, the UAV 200 engages or maintains the engagement of the thrusting motor that rotates the thrusting propeller at a rotational speed sufficient to generate a horizontal force (thrust).

As the thrusting propeller increases in rotational speed, thereby increasing the horizontal force generated by the thrusting propeller, the UAV may reduce the rotational speed of one or more of the lifting propellers and/or reduce the pitch and/or roll of the UAV 200 to reduce the horizontal force generated by the lifting propellers. Likewise, in implementations in which the UAV 200 includes a wing, the airfoil design of the wing generates a vertical force in relation to the horizontal airspeed of the UAV 200 and the pitch of the UAV 200. In such an implementation, as the lifting force from the wing increases, the rotational speed of one or more of the lifting motors may likewise decrease.

The materials handling facility airspeed threshold, the transition airspeed threshold and/or the delivery location airspeed threshold may be the same or different. For example, because the agility and maneuverability of the UAV may be decreased when utilizing the thrusting propeller, the delivery location airspeed threshold may be higher than the materials handling facility airspeed threshold and/or the transition airspeed threshold. This difference may be so that the UAV is more agile and can respond more quickly to the conditions at or around the delivery location, which may be unknown. Likewise, when the UAV is controlled by the lifting motors without engaging the thrusting motor, it can maneuver in any direction without regard to the direction of force generated by the thrusting motor rotating the thrusting propeller.

In a similar manner, even though the airspace above the materials handling facility may be controlled, the materials handling facility airspeed threshold may be higher than the transition airspeed threshold to provide additional maneuverability as the UAV is transitioning from the materials handling facility to the transition altitude position 203.

Similar to the flight path 250 from the materials handling facility 201 to the delivery location 208, a similar flight path may be followed from the delivery location 208 to the materials handling facility 201. When departing the delivery location after the payload has been delivered, the horizontal airspeed of the UAV may be monitored and a determination made as to whether the horizontal airspeed exceeds a delivery location airspeed threshold. If the horizontal airspeed exceeds the delivery location airspeed threshold, the thrusting motor is engaged and the lifting rotational speed of the lifting motors may be adjusted.

Likewise, as the UAV navigates the second path 204 of the flight plan 250, it may be determined if the transition airspeed threshold has been exceeded. If the transition airspeed threshold is exceeded, the thrusting motor is engaged or maintained to provide horizontal thrust to propel the UAV along the second path 204. Finally, as the UAV navigates the first path, the horizontal airspeed of the UAV is monitored and a determination made as to whether the horizontal airspeed exceeds the materials handling facility airspeed threshold. If the horizontal airspeed exceeds the materials handling facility airspeed threshold, the thrusting motor may be engaged or maintained and the rotational speed of the lifting motors adjusted. In comparison, if the horizontal airspeed does not exceed an airspeed threshold (e.g., the materials handling facility airspeed threshold, the transition airspeed threshold, and the delivery location airspeed threshold) the thrusting motor is disengaged and the UAV is navigated using the lifting motors and corresponding lifting propellers.

FIG. 3 depicts another flight plan 350 from a materials handling facility 301 to a delivery location 308, according to an implementation. The information included in the flight plan 350 and the operation of the UAV 300 is similar to the discussion above with respect to FIG. 2.

Similar to the flight plan 250 of FIG. 2, the flight plan 350 illustrated in FIG. 3 includes a first path 302 from the materials handling facility 301 to a transition altitude position 303, a second path 304 from the transition altitude position 303 to a delivery altitude position 305 above the delivery location 308 and a third path 306 from the delivery altitude position 305 to the delivery location 308. As discussed with respect to FIG. 2, in many implementations, a UAV 300 may transition from within a materials handling facility 301 to a position outside of the materials handling facility 301. For example, the materials handling facility 301 may include doors or other openings through which a UAV 300 may navigate to transition from inside a materials handling facility to outside the materials handling facility. The doors or other openings may be on the sides and/or top of the materials handling facility 301. For example, the flight plan 350 may initiate inside the materials handling facility 301 where the UAV 300 may engage or be coupled with a payload that is to be delivered to the delivery location 238 and transition through an opening in the top or roof of the materials handling facility 301 to outside of the materials handling facility 301.

Based on the monitored environmental conditions outside of the materials handling facility, the first path 302 may be established to instruct a UAV 300 to orient a heading of the UAV 300 into the wind and provide the wind speed information to the UAV 300 so that it can anticipate and adjust the rotational speed of the UAV motors (lifting motors and/or thrusting motor) to account for the horizontal force that will be applied to the UAV 300 when the UAV 300 transitions from inside the materials handling facility to outside the materials handling facility.

In contrast to the first path 202 (FIG. 2), the first path 302 (FIG. 3) follows and arced path from the materials handling facility to the transition altitude position 303. By instructing the UAV 350 to navigate the first path 302 following an ascending arc, if the UAV includes a wing, as the horizontal airspeed of the UAV increases, the vertical force (lift) generated by the wing will aid in navigating the UAV to the transition altitude position 303, while reducing the amount of power consumed. Likewise, if the UAV is traveling along and ascending arc, there will be less impact on the position of the UAV when it transitions from inside the materials handling facility to outside the materials handling facility because it is already traveling in a direction that includes a horizontal component and therefore producing a horizontal force that will at least partially counteract the force from the wind.

Similar to the flight plan 250, as the UAV navigates the different paths 302, 304, 306 of the flight plan 350, the horizontal airspeed of the UAV is monitored and if the horizontal airspeed exceeds an airspeed threshold (materials handling facility threshold, transition airspeed threshold, delivery location airspeed threshold), the thrusting motor may be engaged to rotate the thrusting propeller to generate a horizontal force.

For example, the horizontal airspeed is monitored as the UAV travels along the first path 302 and a determination made as to whether the horizontal airspeed exceeds a materials handling facility airspeed threshold. If the horizontal airspeed exceeds the materials handling facility airspeed threshold, the thrusting motor may be engaged to rotate the thrusting propeller. As the UAV navigates the second path 304, the horizontal airspeed of the UAV is monitored to determine if the horizontal airspeed exceeds a transition airspeed threshold. If the horizontal airspeed exceeds a transition airspeed threshold, the thrusting motor is engaged or maintained to rotate the thrusting propeller. Finally, as the UAV navigates the third path to the delivery location, the horizontal airspeed is monitored to determine if the horizontal airspeed exceeds the delivery location airspeed threshold. If the horizontal airspeed exceeds the delivery location airspeed threshold, the thrusting motor is engaged or maintained to rotate the thrusting propeller.

As discussed above, each of the airspeed thresholds (materials handling facility airspeed threshold, transition airspeed threshold, delivery location airspeed threshold) may be the same or different. Likewise, the UAV may travel a similar flight plan from the delivery location to the materials handling facility. While the example above discusses comparing the horizontal airspeed of the UAV to three airspeed thresholds, it will be appreciated that in other implementations additional or fewer airspeed thresholds may be considered. For example, multiple different airspeed thresholds may be utilized for different segments of the second path of the flight plan. As another example, different airspeed thresholds may be considered as the UAV navigates from the delivery location to the materials handling facility, or to another location. In yet another implementation, rather than or in addition to monitoring an airspeed threshold, if the UAV includes a wing, when the UAV is moving in a direction that includes a horizontal component and/or there is measured horizontal airspeed, the thrusting motor may be engaged and the altitude of the UAV may be monitored. If the altitude of the UAV increases beyond a commanded altitude, the rotational speed of the lifting motors may be decreased, the pitch of the UAV may be decreased, and/or the rotational speed of the thrusting motors may be decreased to reduce the lift generated by the wing. Likewise, if the altitude of the UAV decreases beyond a commanded altitude, the rotational speed of the thrusting motor may increase, to generate more lift from the wing, the pitch of the UAV may be adjusted, and/or the rotational speed of the lifting motors may increase.

By monitoring the horizontal airspeed of the UAV, engaging or maintaining the thrusting motor when the horizontal airspeed exceeds a threshold or commanded altitude and decreasing the rotational speed of the lifting motors, the power efficiency of the UAV increases, thereby extending the flight duration before the power modules of the UAV need to be recharged or replaced. In some implementations, once the airspeed threshold has been exceeded, the thrusting motor may be maintained until the horizontal airspeed falls below a disengage airspeed threshold, which may be lower than the airspeed threshold. For example, if the airspeed threshold is 5 knots, once the horizontal airspeed is determined to exceed 5 knots and the thrusting motor is engaged, the thrusting motor may be maintained until the horizontal airspeed falls below 3 knots (disengage airspeed threshold). Separating the airspeed threshold and the disengage airspeed threshold limits instances of the thrusting motor engaging and disengaging when the horizontal airspeed is approximately equal to the airspeed threshold.

Figure 4:
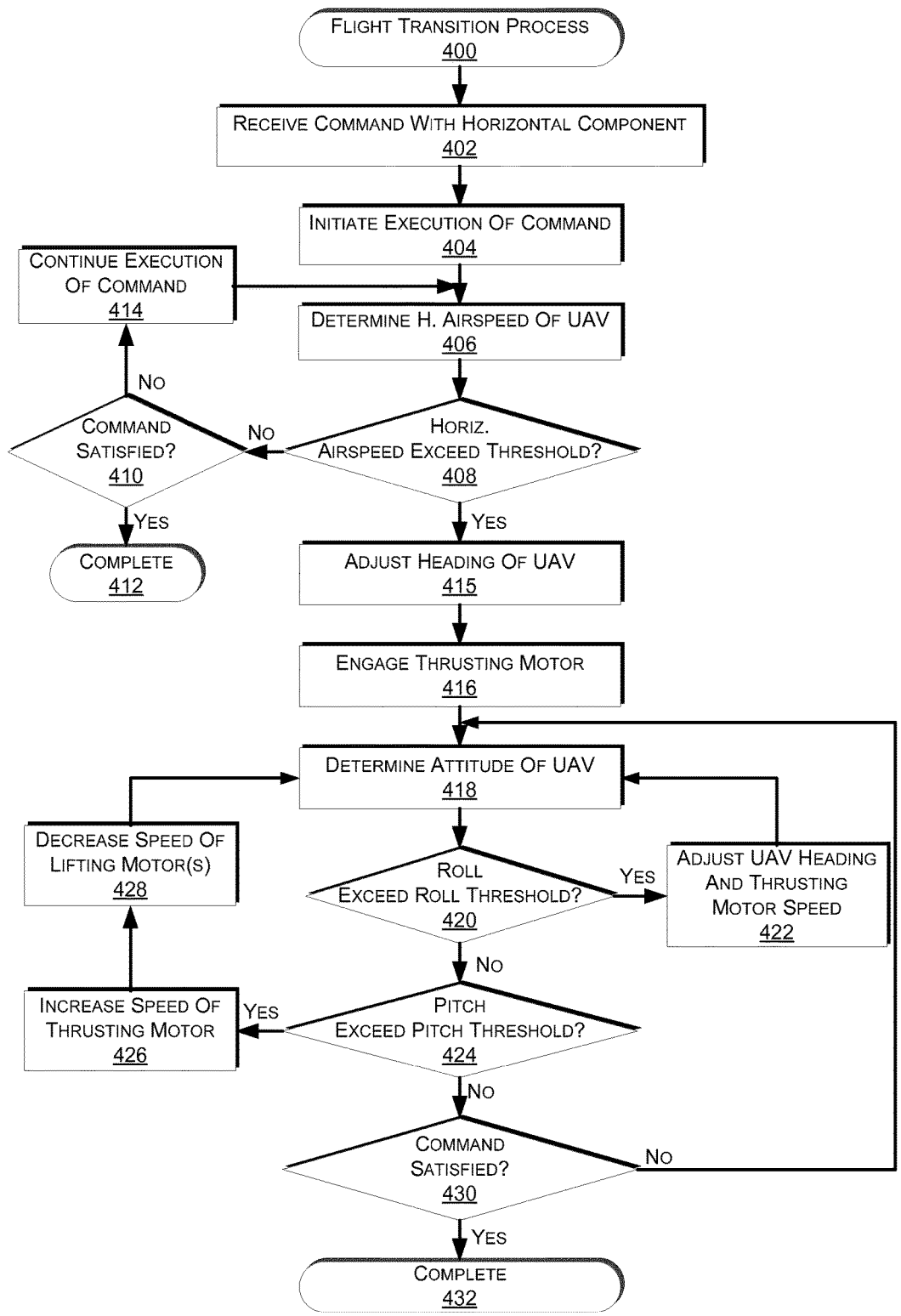
FIG. 4 is a flow diagram of a flight path transition process, according to an implementation.

FIG. 4 is a flow diagram of a flight path transition process 400, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins upon receipt of a navigation command that includes a horizontal component, as in 402. A navigation command may be received from a source external to the UAV, such as from a UAV management system, a remote controller, another UAV, etc. Alternatively, the navigation command may be internal to the UAV. For example, if the UAV is following a flight plan and/or flight path, the navigation command may be part of the UAV's navigation. In response to receiving a navigation command, the UAV begins execution of the command, as in 404.

As the navigation command is being executed, the horizontal airspeed of the UAV is determined, as in 406, and a determination is made as to whether the horizontal airspeed of the UAV exceeds an airspeed threshold, as in 408. As discussed above, the UAV may maintain multiple airspeed thresholds and depending on the navigation of the UAV, one of the airspeed thresholds may be considered. For example, if the UAV is following a transition path or transitioning between paths, the UAV may consider a transition airspeed threshold. Similarly, if the UAV is following a path to or from a delivery location, the UAV may consider a delivery location airspeed threshold. If the UAV is navigating to or from a materials handling facility, the UAV may consider a materials handling facility airspeed threshold. The airspeed threshold(s) may be any defined value and may vary for different UAVs, different UAV configurations, different locations, different times of day, different seasons, etc.

If it is determined that the horizontal airspeed does not exceed the considered airspeed threshold, a determination is made as to whether the navigation command is satisfied, as in 410. If the navigation command is not satisfied, execution of the navigation command continues, as in 414, and the example process 400 returns to block 406 and continues. If it is determined that the navigation command has been satisfied, the example process 400 completes, as in 412.

While the example process 400 discusses receiving and executing navigation commands, it will be appreciated that the blocks 402, 404, 410, 412, and 414 may be optional and the example process 400 may continually monitor the horizontal airspeed of the UAV, as in 406. In such a configuration, if it is determined at decision block 408 that the horizontal airspeed does not exceed the considered airspeed threshold, the example process 400 returns to block 406 and continues.

If it is determined that the horizontal airspeed exceeds a horizontal threshold, the heading of the UAV is adjusted, if necessary, to position the thrusting motor in a direction that is at least partially into the wind, as in 415. Likewise, in implementations in which the UAV includes a wing, the pitch of the UAV may be adjusted such that the wing will generate a positive vertical force as the UAV begins moving in a horizontal direction.

Once the heading of the UAV has been adjusted, the thrusting motor is engaged, as in 416. As discussed above, when the thrusting motor is engaged it causes the thrusting propeller to rotate and generate a horizontal force. The rotational speed and corresponding horizontal force may be increased or decreased by adjusting the speed of the thrusting motor and/or by adjusting the pitch of the blades of the thrusting propeller. Accordingly, as the blocks 418-430 are performed, the rotational speed of one or more of the thrusting motor and/or one or more of the lifting motors may be adjusted. In one implementation, the UAV control system may maintain a schedule or log identifying an estimated rotational speed needed from the thrusting motor to generate a lift from a wing and/or to generate sufficient horizontal force. The schedule may be based on the configuration of the UAV (e.g., size, weight, shape) the diameter and/or pitch of the thrusting propeller, the horizontal airspeed, the pitch, yaw or roll of the UAV, etc.

Figure 5:
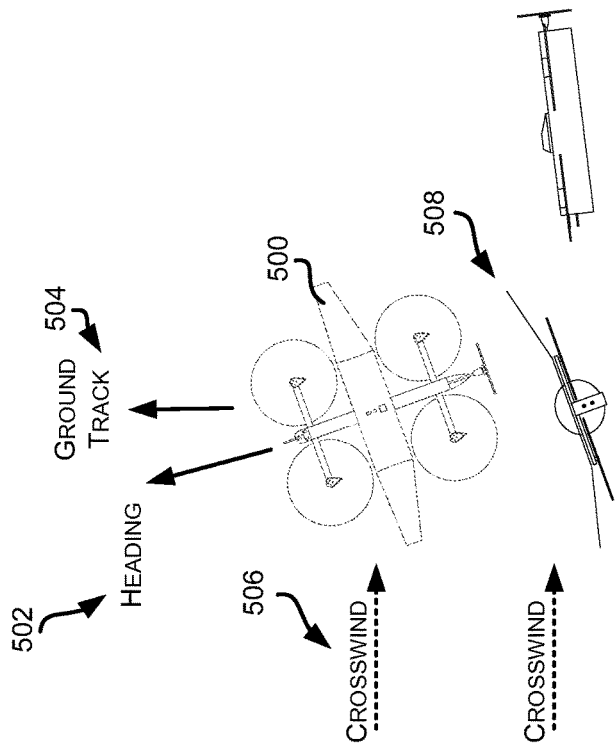
FIG. 5 is a third angle orthographic projection of a UAV illustrating the heading, the ground track, pitch, yaw, and roll of a UAV in response to a crosswind without using a thrusting motor, according to an implementation.

Upon engaging the thrusting motor, an attitude of the UAV is determined, as in 418. The attitude of the UAV identifies the orientation of the UAV's pitch, yaw, and roll axes. Based on the attitude of the UAV, a determination is made as to whether the roll of the UAV exceeds a roll threshold, as in 420. For example, FIG. 5 is a third angle orthographic projection of a UAV 500 illustrating the heading 502, ground track 504, pitch, yaw, and roll of the UAV in response to a crosswind 506, according to an implementation. If the UAV is flying through a crosswind 506, the roll of the UAV will be into the crosswind 506, as illustrated by the front view 508 of the UAV 500, so that the lifting motors can generate a horizontal force sufficient to offset the force of the crosswind 506 and allow the UAV to follow a ground track 504 specified in a flight path. In some implementations, rather than, or in addition to considering the roll of the UAV, if the angle of lifting motors and corresponding lifting propellers with respect to the frame of the UAV can be altered, the example process may consider the whether the angle of the lifting motors and corresponding lifting propellers exceeds a defined threshold. Without using the thrusting motors, the roll of the UAV 500 results in additional force on the UAV by the crosswind because of the increased surface area of the UAV being exposed to the crosswind. As a result, the lifting motors 500 of the UAV must provide additional force to maintain the commanded altitude and ground track 504 and therefore consume more power.

Figure 6:
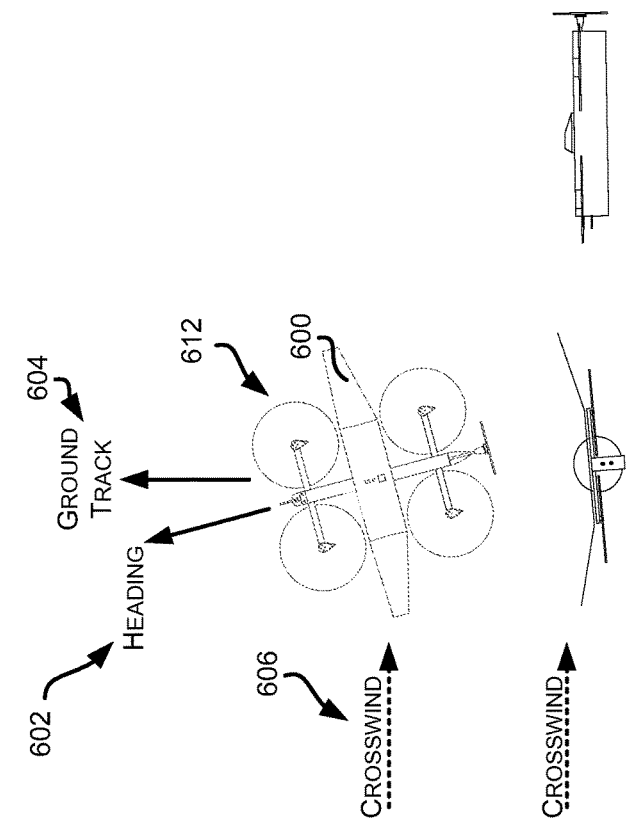
FIG. 6 is a third angle orthographic projection of a UAV illustrating the heading, the ground track, pitch, yaw, and roll of a UAV in response to a crosswind when using a thrusting motor, according to an implementation.

Returning to FIG. 4, if it is determined that the roll of the UAV exceeds a roll threshold, the heading of the UAV is adjusted and the rotational speed of the thrusting motor is increased, as in 422. For example, FIG. 6 is a third angle orthographic projection of a UAV 600 illustrating the heading 602, ground track 604, pitch, yaw, and roll of the UAV 600 in response to a crosswind when using a thrusting motor, according to an implementation. When a thrusting motor of the UAV is utilized or the rotational speed increased, the heading 602 of the UAV 604 may be adjusted with respect to the wind and the roll of the UAV may be decreased as the horizontal airspeed across the wing increases, without disrupting the ground track and/or altitude of the UAV, as illustrated in the plan view 612 of the UAV 600. Likewise, the rotational speed of the lifting motors may be adjusted to account for the change in forces resulting from the altered heading of the UAV and increased thrusting force generated by the thrusting motor, so that the UAV continues to follow the ground track 604 at the commanded altitude.

Figure 7:
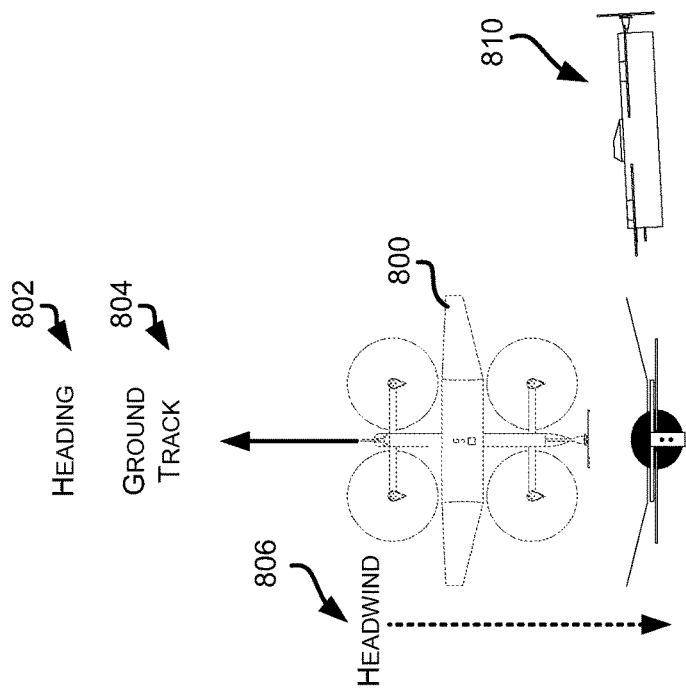
FIG. 7 is a third angle orthographic projection of a UAV illustrating the heading, the ground track, pitch, yaw, and roll of a UAV in response to a headwind without using a thrusting motor, according to an implementation.

Returning to FIG. 4, upon altering the heading and thrusting motor of the UAV, the example process 400 returns to block 418 and continues. If it is determined that the roll of the UAV does not exceed a roll threshold, a determination is made as to whether the pitch of the UAV exceeds a pitch threshold, as in 424. For example, FIG. 7 is a third angle orthographic projection of a UAV 700 illustrating the heading 702, ground track 704, pitch, yaw, and roll of a UAV 700 in response to a headwind 706, according to an implementation. If the UAV 700 is flying through a headwind 706, the pitch of the UAV 700 will be altered as illustrated by the side view 710 of the UAV 700, so that the lifting motors can generate a horizontal force sufficient to offset the force of the headwind 706 and allow the UAV to follow a ground track 704 specified in a flight path. Because the UAV's pitch is adjusted the surface area of the UAV exposed to the headwind 706 is increased, resulting in additional force created by the wind. In response, the UAV must generate additional force from the propellers, thereby further reducing the power efficiency of the UAV.

In some implementations, rather than, or in addition to considering the pitch of the UAV, if the angle of lifting motors and corresponding lifting propellers with respect to the frame of the UAV can be altered, the example process may consider whether the angle of the lifting motors and corresponding lifting propellers exceeds a defined threshold.

Figure 8:
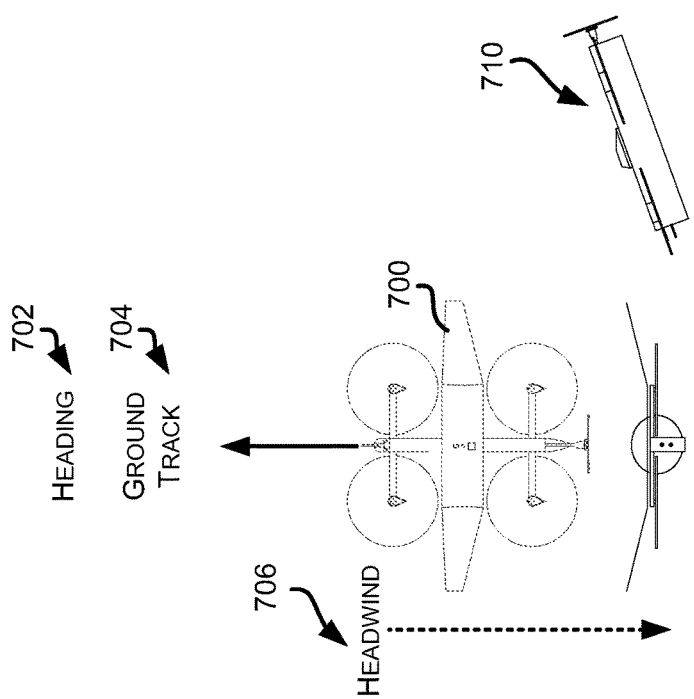
FIG. 8 is a third angle orthographic projection of a UAV illustrating the heading, the ground track, the pitch, yaw, and roll of a UAV in response to a headwind when using a thrusting motor, according to an implementation.

Returning to FIG. 4, if it is determined that the pitch of the UAV exceeds a pitch threshold, the rotational speed of the thrusting motor is increased, as in 426, and/or the rotational speed of the lifting motors is decreased, as in 428. For example, FIG. 8 is a third angle orthographic projection of a UAV 800 illustrating the heading 802, ground track 804, pitch, yaw, and roll of the UAV 800 in response to a headwind 806 when using a thrusting motor, according to an implementation. When a thrusting motor of the UAV 800 is utilized, the pitch of the UAV 800 may be decreased without disrupting the ground track and/or altitude of the UAV, as illustrated by the side view 810 of the UAV 800.

In implementations, in which the UAV includes a wing, when the rotational speed of the thrusting motor is increased and the horizontal airspeed of the UAV increases, the vertical lift generated by the wing will increase. To maintain the UAV at a desired pitch and altitude, as the vertical lift from the wing increases, the rotational speed of the lifting motors and resulting force generated by the lifting motors may decrease.

If the pitch of the UAV does not exceed the pitch threshold, a determination is made as to whether the navigation command is satisfied, as in 430. If it is determined that the navigation command is not satisfied, the example process 400 returns to block 418 and continues. However, if it is determined that the navigation command is satisfied, the example process 400 completes, as in 432. Similar to the discussion above, decision block 430 may be optional and the example process may continually monitor the horizontal airspeed of the UAV. In such an implementation, if it is determined at decision block 424 that the pitch of the UAV does not exceed a pitch threshold, the example process 400 returns to block 418 and continues.

Figure 9:
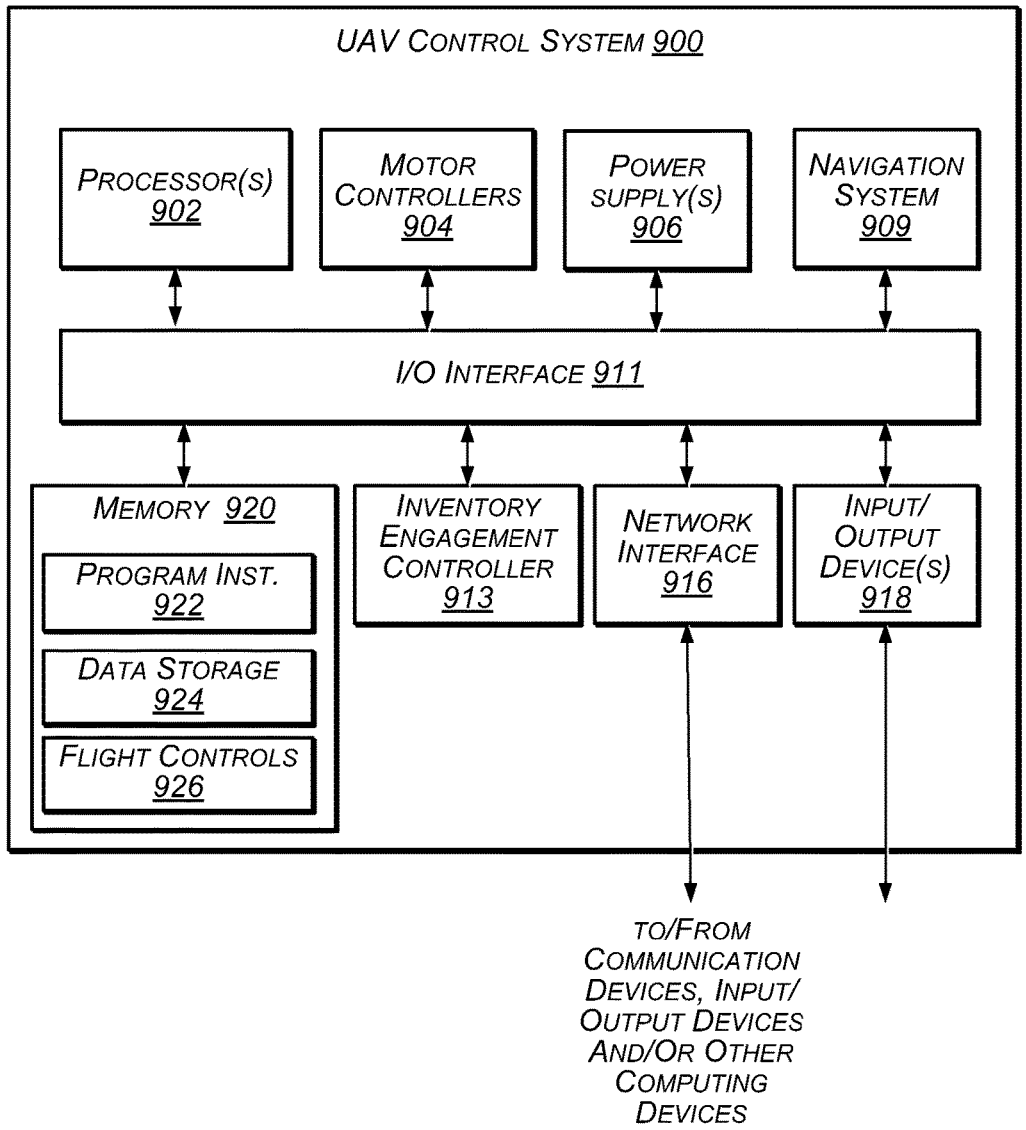
FIG. 9 is a block diagram of an illustrative implementation of a server system that may be used with various implementations.

FIG. 9 is a block diagram illustrating an example UAV control system 900 that may be utilized with a UAV as discussed herein. In various examples, the block diagram may be illustrative of one or more aspects of the UAV control system 900 that may be used to implement the various systems and methods discussed herein and/or to control operation of the UAV. In the illustrated implementation, the UAV control system 900 includes one or more processors 902, coupled to a memory, e.g., a non-transitory computer readable storage medium 920, via an input/output (I/O) interface 910. The UAV control system 900 may also include electronic speed controls 904 (ESCs), power supply modules 906 and/or a navigation system 908. The UAV control system 900 further includes a payload engagement controller 912, a network interface 916, and one or more input/output devices 918.

In various implementations, the UAV control system 900 may be a uniprocessor system including one processor 902, or a multiprocessor system including several processors 902 (e.g., two, four, eight, or another suitable number). The processor(s) 902 may be any suitable processor capable of executing instructions. For example, in various implementations, the processor(s) 902 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 902 may commonly, but not necessarily, implement the same ISA.

The non-transitory computer readable storage medium 920 may be configured to store executable instructions, data, flight plans, flight paths, flight control parameters, airspeed thresholds, and/or data items accessible by the processor(s) 902. In various implementations, the non-transitory computer readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 920 as program instructions 922, data storage 924 and flight controls 926, respectively. In other implementations, program instructions, data, and/or flight controls may be received, sent, or stored upon different types of computer-accessible media, such as non-transitory media, or on similar media separate from the non-transitory computer readable storage medium 920 or the UAV control system 900. Generally speaking, a non-transitory, computer readable storage medium may include storage media or memory media such as magnetic or optical media, e.g., disk or CD/DVD-ROM, coupled to the UAV control system 900 via the I/O interface 910. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 916.

In one implementation, the I/O interface 910 may be configured to coordinate I/O traffic between the processor(s) 902, the non-transitory computer readable storage medium 920, and any peripheral devices, the network interface or other peripheral interfaces, such as input/output devices 918. In some implementations, the I/O interface 910 may perform any necessary protocol, timing or other data transformations to convert data signals from one component (e.g., non-transitory computer readable storage medium 920) into a format suitable for use by another component (e.g., processor(s) 902). In some implementations, the I/O interface 910 may include support for devices attached through various types of peripheral buses, such as a variant of the Peripheral Component Interconnect (PCI) bus standard or the Universal Serial Bus (USB) standard, for example. In some implementations, the function of the I/O interface 910 may be split into two or more separate components, such as a north bridge and a south bridge, for example. Also, in some implementations, some or all of the functionality of the I/O interface 910, such as an interface to the non-transitory computer readable storage medium 920, may be incorporated directly into the processor(s) 902.

The motor controllers 904 communicate with the navigation system 908 and adjust the rotational speed of each lifting motor and/or the thrusting motor to stabilize the UAV and guide the UAV along a determined flight path.

The navigation system 908 may include a global positioning system (GPS), indoor positioning system (IPS), or other similar system and/or sensors that can be used to navigate the UAV 100 to and/or from a location. The payload engagement controller 912 communicates with the actuator(s) or motor(s) (e.g., a servo motor) used to engage and/or disengage items.

The network interface 916 may be configured to allow data to be exchanged between the UAV control system 900, other devices attached to a network, such as other computer systems (e.g., remote computing resources), and/or with UAV control systems of other UAVs. For example, the network interface 916 may enable wireless communication between the UAV 100 and a UAV control system that is implemented on one or more remote computing resources. For wireless communication, an antenna of an UAV or other communication components may be utilized. As another example, the network interface 916 may enable wireless communication between numerous UAVs. In various implementations, the network interface 916 may support communication via wireless general data networks, such as a Wi-Fi network. For example, the network interface 916 may support communication via telecommunications networks, such as cellular communication networks, satellite networks, and the like.

Input/output devices 918 may, in some implementations, include one or more displays, imaging devices, thermal sensors, infrared sensors, time of flight sensors, accelerometers, pressure sensors, weather sensors, etc. Multiple input/output devices 918 may be present and controlled by the UAV control system 900. One or more of these sensors may be utilized to assist in determining whether to engage and/or disengage the thrusting motor, as well as to avoid obstacles during flight.

As shown in FIG. 9, the memory may include program instructions 922, which may be configured to implement the example routines and/or sub-routines described herein. The data storage 924 may include various data stores for maintaining data items that may be provided for determining flight paths, landing, identifying locations for disengaging items, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 900 is merely illustrative and is not intended to limit the scope of the present disclosure. In particular, the computing system and devices may include any combination of hardware or software that can perform the indicated functions. The UAV control system 900 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 900. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the UAV control system 900 may be transmitted to the UAV control system 900 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method to control an unmanned aerial vehicle ("UAV"), the method comprising:
   under control of one or more computing systems configured with executable instructions;
   determining a first force and a first direction of a wind outside of a materials handling facility;
   determining, while the UAV is positioned inside the materials handling facility and based at least in part on the first force and the first direction of the wind outside of the materials handling facility:
   a heading for the UAV; and
   a second force to be generated by the UAV as the UAV transitions from inside the materials handling facility to outside the materials handling facility;
   causing, while the UAV is positioned inside the materials handling facility, the UAV to be oriented according to the heading;
   rotating, with a plurality of lifting motors coupled to the UAV and while the UAV is positioned inside the materials handling facility, a plurality of lifting propellers to generate a third force sufficient to cause the UAV to ascend and transition from inside the materials handling facility to outside the materials handling facility;

rotating, with a thrusting motor coupled to the UAV and while the UAV is transitioning from inside the materials handling facility to outside the materials handling facility, a thrusting propeller to generate the second force;
receiving a navigation command to fly the UAV in a direction that includes a horizontal component;
in response to initiating an execution of the navigation command, determining that a first horizontal airspeed of the UAV exceeds a threshold; and
decreasing a rotational speed of at least one of the plurality of lifting propellers.

2. The method of claim 1, wherein the rotational speed of the at least one plurality of lifting propellers is decreased in an amount proportional to a third force generated by a wing of the UAV in proportion to a horizontal airspeed of the UAV.

3. The method of claim 1, further comprising:
determining that an amount of a roll of the UAV exceeds a roll threshold;
adjusting the heading of the UAV to decrease the amount of the roll of the UAV; and
adjusting at least one of a rotational speed of the thrusting propeller or the rotational speed of at least one of the plurality of lifting propellers.

4. The method of claim 1, further comprising:
determining that an amount of a pitch of the UAV exceeds a pitch threshold; and
adjusting a rotational speed of the thrusting propeller.

5. The method of claim 1, wherein the UAV transitions from inside the materials handling facility to outside the materials handling facility through an opening in a top or roof of the materials handling facility.

6. An unmanned aerial vehicle ("UAV"), comprising:
a plurality of lifting motors and a plurality of lifting propellers coupled to the plurality of lifting motors;
a thrusting motor and a thrusting propeller;
a flight control component configured to at least:
receive an indication of a first force and a first direction of a wind outside of a materials handling facility;
determine, while the UAV is positioned inside the materials handling facility and based at least in part on the first force and the first direction of the wind outside of the materials handling facility:
a heading for the UAV; and
a second force to be generated by the UAV as the UAV transitions from inside the materials handling facility to outside the materials handling facility;
cause, while the UAV is positioned inside the materials handling facility, the UAV to be oriented according to the heading;
cause the UAV to aerially transition from inside the materials handling facility to outside the materials handling facility;
cause a thrusting motor coupled to the UAV, and while the UAV is transitioning from inside the materials handling facility to outside the materials handling facility, to rotate the thrusting propeller to generate the second force;
estimate a horizontal airspeed of the UAV;
determine that the estimated horizontal airspeed of the UAV exceeds a threshold; and
cause at least one of the plurality of lifting motors to decrease a rotational speed of a corresponding lifting propeller.

7. The UAV of claim 6, wherein the rotational speed is determined based on a schedule maintained by the UAV, the schedule identifying an estimated rotation speed sufficient to generate a thrust, wherein the schedule is determined based at least in part on one or more of: a weight of the UAV, a size of the UAV, a shape of the UAV, a wing of the UAV, a diameter of the thrusting propeller, a pitch of the thrusting propeller, the estimated horizontal airspeed, a pitch of the UAV, a roll of the UAV, or a yaw of the UAV.

8. The UAV of claim 6, further comprising:
a guidance component configured to at least:
determine that a roll amount exceeds a roll threshold;
instruct at least one of:
at least one of the plurality of lifting motors to adjust a rotational speed of a corresponding lifting propeller to cause a heading of the UAV to change, or
an aileron or elevator to adjust to cause the heading of the UAV to change; and
instruct the thrusting motor to adjust the rotational speed of the thrusting propeller an amount sufficient to maintain a commanded ground track.

9. The UAV of claim 8, the UAV further comprising:
a wing; and
wherein:
the heading of the UAV is changed to orient the UAV at least partially toward a direction of the wind as the UAV transitions from inside the materials handling facility to outside the materials handling facility; and
the guidance component is further configured to instruct at least one of the plurality of lifting motors to decrease a rotational speed of a corresponding lifting propeller in an amount proportional to a lifting force generated by the wing.

10. The UAV of claim 6, further comprising:
a guidance component configured to at least:
determine that a pitch exceeds a pitch threshold;
instruct the thrusting motor to adjust the rotational speed of the thrusting propeller; and
instruct at least one of the plurality of lifting motors to decrease a rotational speed of a corresponding lifting propeller.

11. The UAV of claim 6, further comprising:
a wing; and
wherein a rotational speed of at least one of the plurality of lifting propellers is decreased in proportion to a lifting force generated by the wing as the estimated horizontal airspeed of the UAV increases.

12. The UAV of claim 6, wherein the UAV has an increased power efficiency when the UAV is traveling in a direction that includes a horizontal component and generating a force with the thrusting propeller.

13. The UAV of claim 6, wherein the UAV transitions from inside the materials handling facility to outside the materials handling facility in either a substantially vertical direction or a substantially horizontal direction.

14. A computer-implemented method to control an unmanned aerial vehicle ("UAV"), the method comprising:
determining an environmental condition above a materials handling facility;
engaging a plurality of lifting motors to generate a lifting force sufficient to transition the UAV from inside the materials handling facility to outside the materials handling facility;
instructing, as the UAV is transitioning from inside the materials handling facility to outside the materials handling facility, the UAV to orient in a desired orientation, the desired orientation based at least in part on the determined environmental condition above the materials handling facility;

engaging a thrusting motor to generate a thrusting force that is approximately opposite in direction of an environmental force acting on the UAV as the UAV transitions from inside the materials handling facility to outside the materials handling facility; and transitioning, after the UAV is outside the materials handling facility, the UAV into a flight trajectory comprising a horizontal component.

15. The computer-implemented method of claim 14, wherein the UAV is configured to decrease a rotational speed of a least one lifting motor as a horizontal airspeed of the UAV increases.

16. The computer-implemented method of claim 14, further comprising:

determining, based at least in part on the environmental condition, at least a portion of a flight plan for the UAV, wherein the at least a portion of the flight plan identifies a first path from a position above the materials handling facility to a transition altitude position.

17. The computer-implemented method of claim 16, wherein the first path is a substantially vertical path from the position above the materials handling facility to the transition altitude position.

18. The computer-implemented method of claim 16, wherein the flight plan further identifies a transition for the UAV to transition from the first path to a second path that includes the flight trajectory comprising the horizontal component.

19. The computer-implemented method of claim 16, wherein the first path includes the horizontal component and a vertical component and the UAV navigates the first path while the UAV is within a defined distance of the materials handling facility.

20. The computer-implemented method of claim 16, wherein the UAV is configured to at least:

engage a thrusting motor and each of a plurality of lifting motors as the UAV navigates the first path; and decrease a rotational speed of at least one of the plurality of lifting motors as a horizontal airspeed of the UAV increases.

* * * * *